US007855996B2

(12) United States Patent
Yousef

(10) Patent No.: US 7,855,996 B2
(45) Date of Patent: Dec. 21, 2010

(54) ENHANCED STREAM LAYER TRANSMISSION FOR MEDIAFLO MOBILE MULTIMEDIA MULTICAST SYSTEM

(75) Inventor: Nabil Yousef, Foothill Ranch, CA (US)

(73) Assignee: Newport Media, Inc., Lake Forrest, CA (US)

( * ) Notice: Subject to any disclaimer, the term of this patent is extended or adjusted under 35 U.S.C. 154(b) by 668 days.

(21) Appl. No.: 11/943,661

(22) Filed: Nov. 21, 2007

(65) Prior Publication Data

US 2009/0129344 A1 May 21, 2009

(51) Int. Cl.
*H04W 4/00* (2009.01)

(52) U.S. Cl. ...................................... 370/336; 370/345

(58) Field of Classification Search ...................... None
See application file for complete search history.

(56) References Cited

U.S. PATENT DOCUMENTS 7,702,046 B2 * 4/2010 Murthy et al. ............. 375/345
7,720,017 B2 * 5/2010 Khan ......................... 370/310
7,813,310 B2 * 10/2010 Song et al. .................. 370/312
2006/0195752 A1 * 8/2006 Walker et al. ............... 714/748
2007/0220573 A1 * 9/2007 Chiussi et al. .............. 725/114
2008/0020751 A1 * 1/2008 Li et al. ...................... 455/424

* cited by examiner

*Primary Examiner*—Chi H Pham
*Assistant Examiner*—Soon-Dong D Hyun
(74) *Attorney, Agent, or Firm*—Rahman LLC

(57) ABSTRACT

Enhancing stream layer transmission for a MediaFLO mobile multimedia multicast system comprising a transmitter and a receiver includes sending a plurality of multicast logical channels (MLC) forming a data frame from the transmitter, wherein each MLC comprises multimedia data streams comprising a stream 0, 1, and 2 data packet, and parity data bits; switching, by the transmitter, an order of the multimedia data streams of the MLC transmitted by the transmitter; sending a signal to the receiver from the transmitter to specify a mode of transmission of the MLC, wherein the mode of transmission comprises an order of transmitting the data packets of the MLC; inserting, by the transmitter, a flag in control information transmitted in the stream 0 data packets; decoding, by the receiver, the flag to determine the mode of transmission; and performing, by the receiver, a CRC of the stream 0 data packet.

23 Claims, 9 Drawing Sheets

ENHANCED STREAM LAYER TRANSMISSION FOR MEDIAFLO MOBILE MULTIMEDIA MULTICAST SYSTEM

BACKGROUND

1. Technical Field

The embodiments herein generally relate to wireless communication systems, and, more particularly, to mobile television (TV) multicast technology.

2. Description of the Related Art

The MediaFLO™ (Forward Link Only) mobile multimedia multicast system available from Qualcomm, Inc., California, USA, is an alternative mobile multicast technology for the efficient transmission of multimedia data streams to mobile devices using TV. Multimedia streams can comprise various channels coming from different sources. The smallest channel transmission unit is called a Multicast Logical Channel (MLC). Each MLC is composed of three streams plus parity bits for error detection as indicated in FIG. 1. These streams are multiplexed/demultiplexed to/from a single MLC in a layer called the stream layer.

Streams 1 and 2 carry audio and video information of the channel requested by the user, while stream 0 carries control information used in the decryption of these audio and video information at the receiver, a number of MLCs are multiplexed together in the time domain to form a frame, and then four frames are packed together in addition to overhead information to form a super-frame having a duration of one second.

A super-frame is divided into four portions as shown in FIG. 2: Time-Division Multiplexing (TDM) pilots, Overhead Information Symbols (OIS), Data, and Pilot Positioning Channel (PPC). TDM1 is the first symbol of a super-frame and marks its beginning. In addition to being used for frame synchronization, TDM1 can also be used for initial time and frequency synchronization, so the receiver can immediately start decoding the information carried by the OIS. The OIS contain the time-frequency allocation for each MLC in the current super-frame. With respect to data, when an MLC is transmitted in a super-frame the payload is divided into four equal bursts, with each burst transmitted in a unique frame. The PPC can be used for transmitter identification and/or position location at the receiver. Super-frames are transmitted in sequence to be received at the service user. To ensure correct reception there must be synchronization between the transmitter and the receiver, and then several steps are performed to get the data streams ready for display.

The scenario at the receiver is as follows. First, the receiver looks for the TDM1 symbol which indicates the beginning of a super-frame as shown in FIG. 3(A). Then, the receiver looks for the OIS symbols to get all the information about the specific location of the MLC in the current super-frame that belongs to the channel required by the user. Second, as the receiver reaches the MLC in any of the four frames, it starts looking for stream 0 to extract several messages (Entitlement Control Messages (ECM) and Encryption Information Messages (EIM)).

Third, the receiver uses these messages, in addition to a message related to each user (Entitlement Management Message (EMM)) defined by the service provider, to be able to extract the code word (CW), which is the key used in the descrambling process as shown in FIG. 3(B). Finally, the receiver uses that CW to descramble the audio and video information contained in streams 1 and 2. This scenario is repeated every super-frame to guarantee efficient reception of data. However, there are some problems associated with this process. One example is shown in FIG. 3(A). First, as previously mentioned, there are several steps performed at the receiver before audio and video data of the required channel are ready to be displayed to the user. Moreover, streams of data are transmitted serially and the third step at the receiver requires getting stream 0, which is found at the end of an MLC after stream 1 and 2. This means that data are at the receiver, but not yet ready for the user as stream 0, needed for CW extraction for descrambling process, comes after data i.e. there must be a buffering stage for the streams queued at the receiver until the CW is ready for the descrambling process.

Second, these steps take approximately 0.5 to 0.75 sec. which is ½ to ¾ of a super-frame (1 sec.). This means that the delay introduced when the user turns on the channel is very large and also during switching from one channel to another; i.e., long channel switching delay. Accordingly, there remains a need to enhance the stream layer transmission for the MediaFLO™ mobile multimedia multicast system.

SUMMARY

In view of the foregoing, an embodiment provides a method of enhancing stream layer transmission for a MediaFLO mobile multimedia multicast system comprising a transmitter and a receiver, wherein the method comprises sending a plurality of multicast logical channels (MLC) forming a data frame from the transmitter, wherein each MLC comprises multimedia data streams comprising a stream 0 data packet, a stream 1 data packet, a stream 2 data packet, and parity data bits, and wherein four data frames comprises a super-frame; switching, by the transmitter, an order of the multimedia data streams of the MLC transmitted by the transmitter; sending a signal to the receiver from the transmitter to specify a mode of transmission of the MLC, wherein the mode of transmission comprises an order of transmitting the data packets of the MLC; inserting, by the transmitter, a flag in control information transmitted in the stream 0 data packets in the MLC; receiving, at the receiver, the flag; decoding, by the receiver, the flag to determine the mode of transmission; and performing, by the receiver, a cyclic redundancy check (CRC) of the stream 0 data packet.

Preferably, the switching of the order of the multimedia data streams of the MLC comprises swapping the stream 2 data packet with the stream 0 data packet, wherein the mode of transmission comprises a first mode comprising an original sequence of multimedia data streams, and a second mode comprising the swapped sequence of multimedia data streams. The method may further comprise decrypting all of a first and second frame of the super-frame in the receiver prior to receiving a third frame of the super-frame in the receiver. Additionally, the method may further comprise personalizing the mode of transmission for individual receivers. Preferably, at the receiver, when the control information is received within a super-frame for each the MLC, the flag indicates the mode of transmission of a certain channel for a specific receiver. Also, the method may further comprise performing error detection on the multimedia data streams. Preferably, the method further comprises correcting errors in the multimedia data streams using redundant data stored on a fourth frame of the super-frame.

Moreover, the method may further comprise detecting an error in the multimedia data streams; switching the mode of transmission to the first mode from the second mode; and correcting the error using the redundant data stored on the fourth frame of the super-frame. Preferably, in the decoding process if an order of the mode of transmission has the stream 0 data packet presented first, then the receiver decoding the stream 0 data packet, and upon successful reception of the stream 0 data packet in the receiver, then the receiver extracting a code word (CW) from the super-frame and performing decryption of the super-frame while receiving data frames. Alternatively, in the decoding process, if the stream 0 data packet is incorrectly decoded based on a result of the CRC check, then the receiver waiting until an end of a transmission of the super-frame to perform a Reed Solomon (RS) decoding process on all content of the super-frame. Still alternatively, in the decoding process, if an order of the mode of transmission has the stream 0 data packet presented last, then the receiver waiting until an entire super-frame is received prior to performing decryption of the super-frame.

Another embodiment provides a system for enhancing stream layer transmission for a MediaFLO mobile multimedia multicast environment, wherein the system comprises a transmitter adapted to send a plurality of multicast logical channels (MLC) forming a data frame, wherein each MLC comprises multimedia data streams comprising a stream 0 data packet, a stream 1 data packet, a stream 2 data packet, and parity data bits, and wherein four data frames comprises a super-frame; a switching mechanism in the transmitter adapted to switch an order of the multimedia data streams of the MLC transmitted by the transmitter; a transmission mechanism in the transmitter adapted to send a signal to a receiver to specify a mode of transmission of the MLC, wherein the mode of transmission comprises an order of transmitting the data packets of the MLC; a flag inserted by the transmitter in control information transmitted in the stream 0 data packets in the MLC, wherein the receiver is adapted to receive the flag to determine the mode of transmission; and CRC hardware on the receiver to perform a CRC of the stream 0 data packet.

Preferably, the switching of the order of the multimedia data streams of the MLC comprises swapping the stream 2 data packet with the stream 0 data packet, wherein the mode of transmission comprises a first mode comprising an original sequence of multimedia data streams, and a second mode comprising the swapped sequence of multimedia data streams. Preferably, the receiver comprises a component adapted to decrypt all of a first and second frame of the super-frame in the receiver prior to receiving a third frame of the super-frame in the receiver. Also, the mode of transmission may be adapted to be personalized for individual receivers. Additionally, at the receiver, when the control information is received within a super-frame for each the MLC, the flag indicates the mode of transmission of a certain channel for a specific receiver. Moreover, the system may further comprise an error detection component in the receiver adapted to perform error detection on the multimedia data streams.

Also, the system may further comprise an error corrector component in the receiver adapted to correct errors in the multimedia data streams using redundant data stored on a fourth frame of the super-frame. Preferably, if an order of the mode of transmission has the stream 0 data packet presented first, then the receiver decodes the stream 0 data packet, and upon successful reception of the stream 0 data packet in the receiver, then the receiver extracts a CW from the super-frame and performing decryption of the super-frame while receiving data frames. Alternatively, if the stream 0 data packet is incorrectly decoded based on a result of the CRC check, then the receiver waits until an end of a transmission of the super-frame to perform a RS decoding process on all content of the super-frame. Still alternatively, if an order of the mode of transmission has the stream 0 data packet presented last, then the receiver waits until an entire super-frame is received prior to performing decryption of the super-frame.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
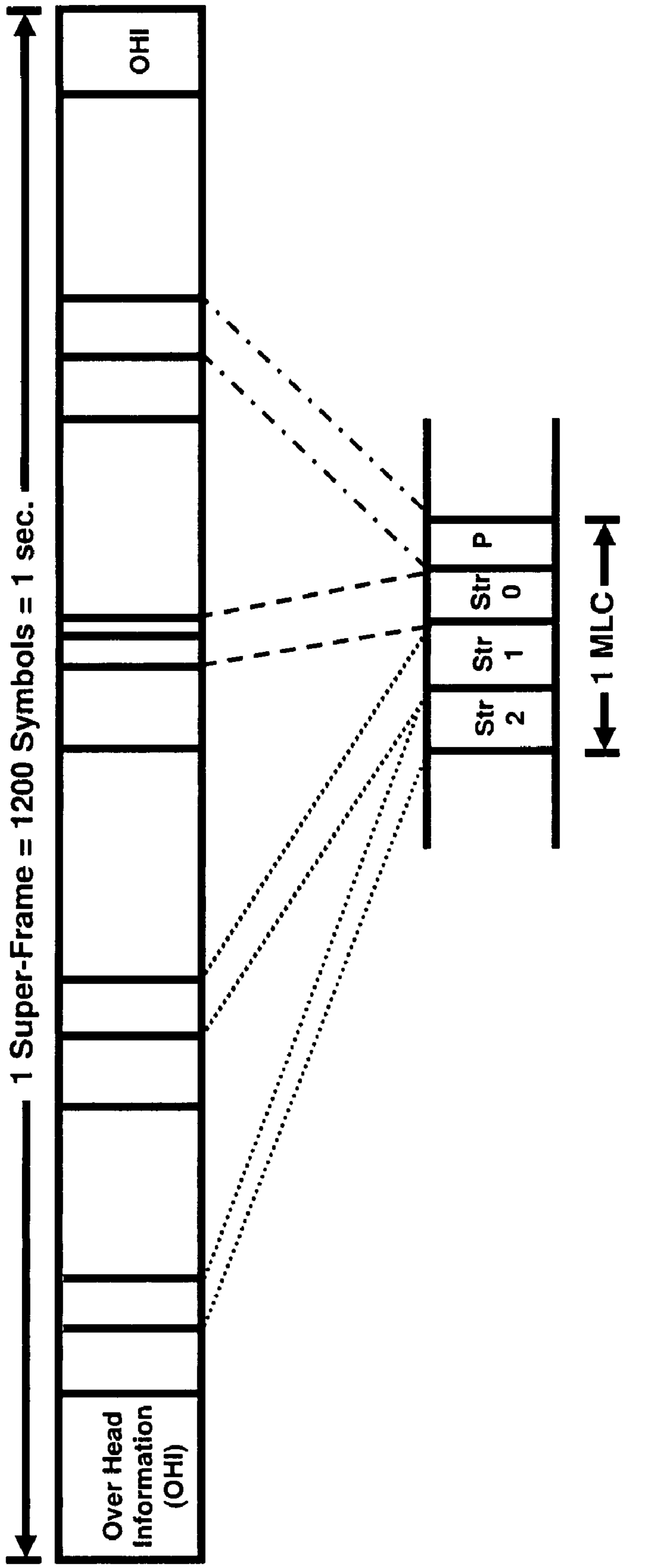
FIG. 1 is a schematic diagram illustrating a data stream in a super-frame structure.
Figure 2:
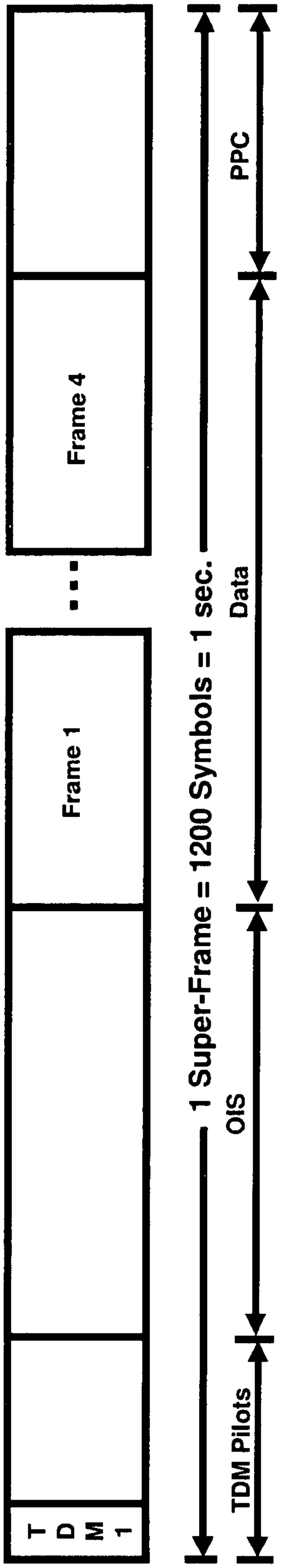
FIG. 2 is a schematic diagram illustrating a super-frame structure.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need to enhance the stream layer transmission for the MediaFLO™ mobile multimedia multicast system. The embodiments herein achieve this by providing a technique that introduces a change in the FLO transmission standard. Referring now to the drawings, and more particularly to FIGS. 4(A) through 7, where similar reference characters denote corresponding features consistently throughout the figures, there are shown preferred embodiments.

Each MLC is composed of stream 0, 1, and 2. These streams are transmitted as stream 2, stream 1, and stream 0, respectively, as indicated in FIG. 1. According to the embodiments herein, first, the transmitter switches the order of streams 0, 1, and 2 through software changes of the transmission instructions. The swapping of streams 0 and stream 2 occur such that stream 0 comes first thus saving more time for the CW extraction steps to be performed as soon as the synchronization occurred and OIS information are received as shown in FIG. 4(A)). By comparing the two cases in FIGS. 3(A) and 4(A), a remarkable decrease in the channel switching delay is observed; consequently the decryption of super-frame 2 in this example begins before super-frame 3 arrives. Super-frame 2 decryption would always begin before super-frame 3 arrival so long as the user requests the channel change during super-frame 1. If the user request was after the OIS of super-frame 2, then the receiver will wait until the next frame to acquire the OIS and then Stream 0.

Figure 3A:
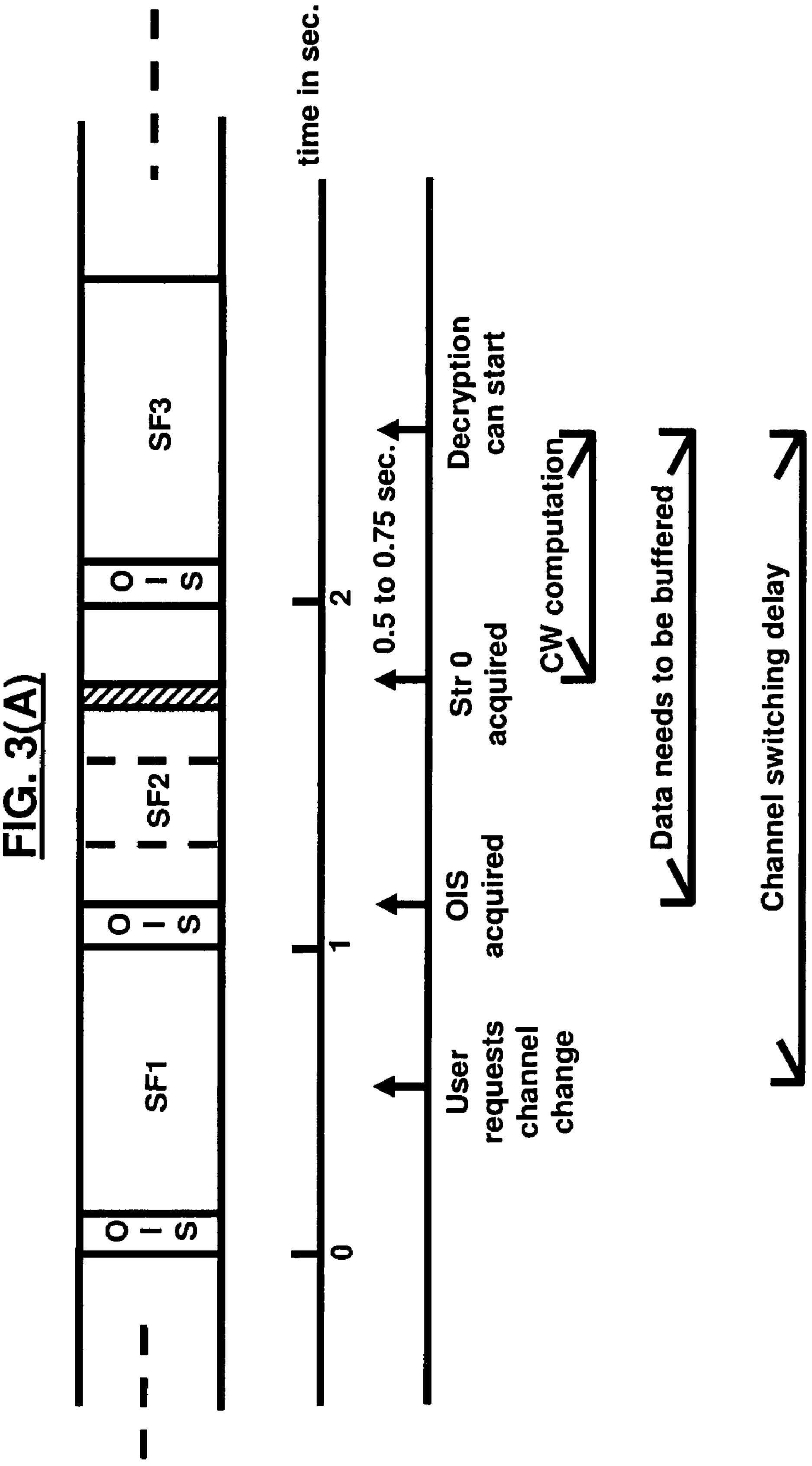
FIG. 3(A) is a schematic diagram illustrating an example of a user requesting a channel change.
Figure 3B:
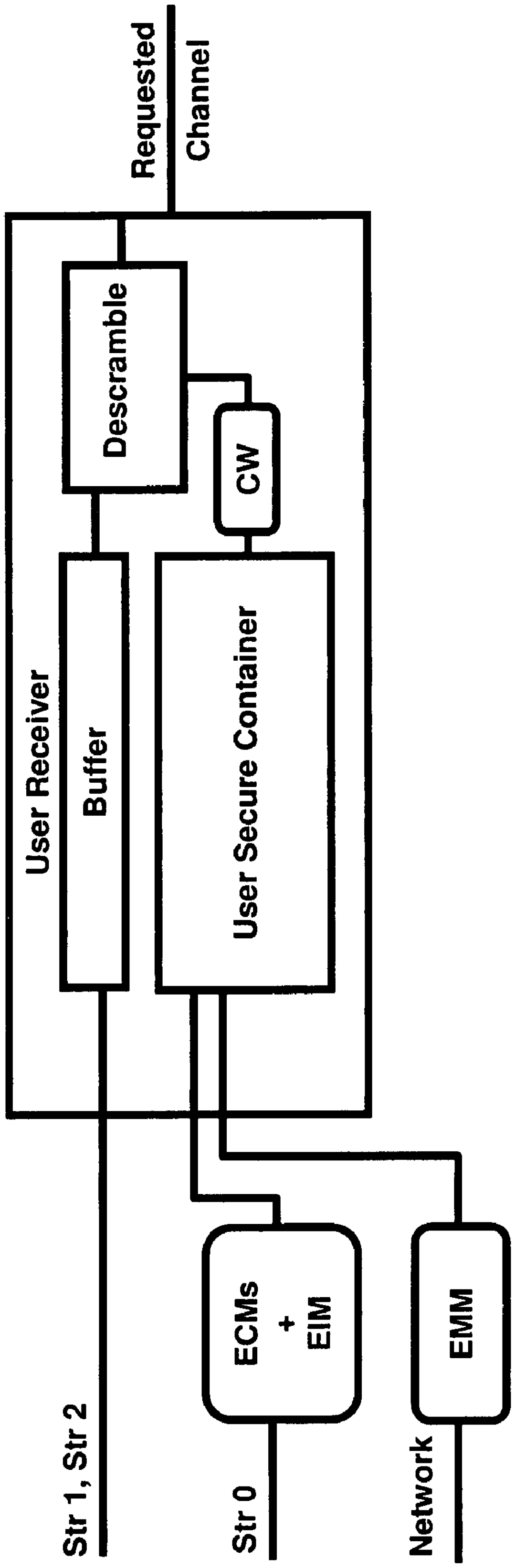
FIG. 3(B) is a schematic diagram illustrating a descrambling process.
Figure 4A:
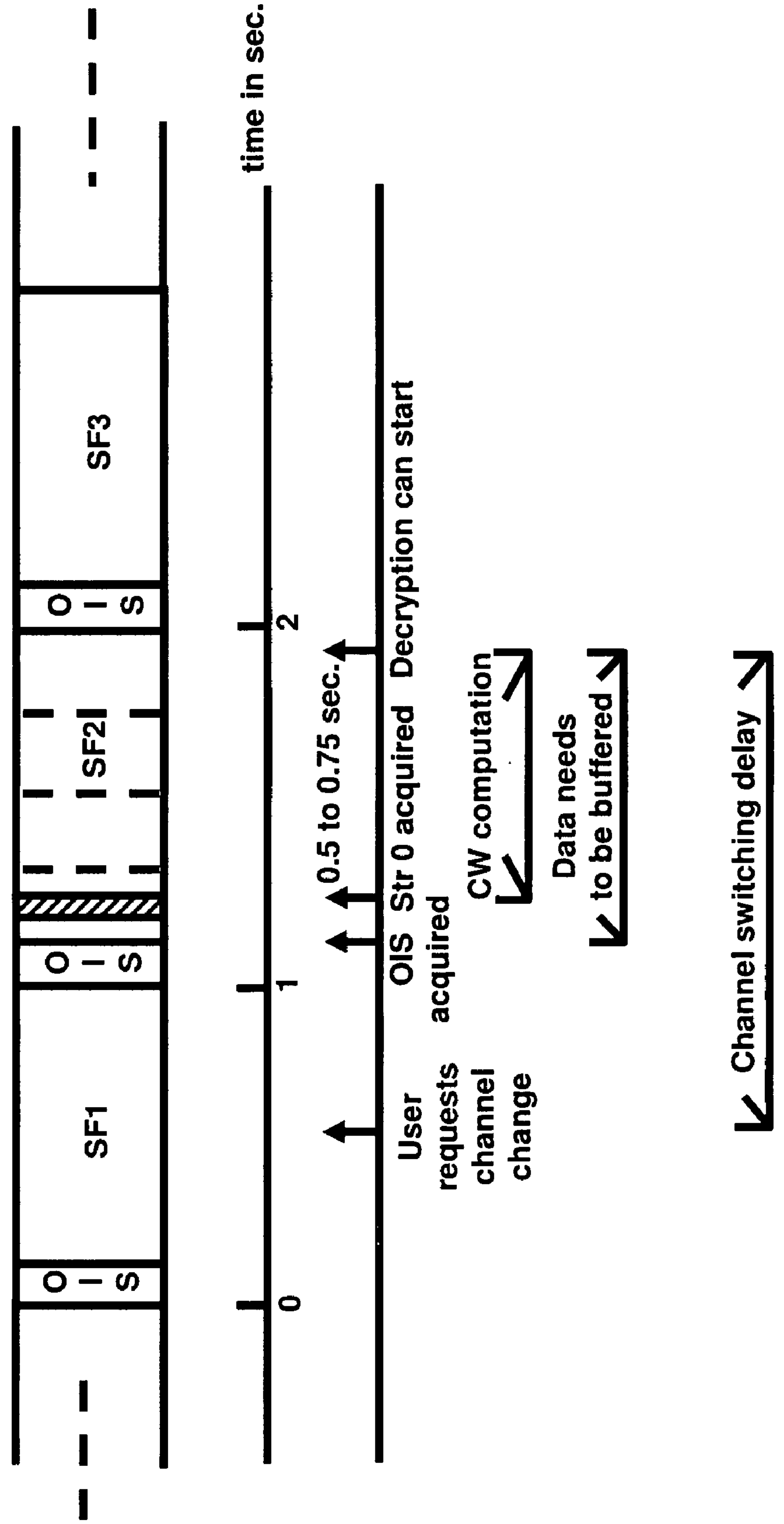
FIG. 4(A) is a schematic diagram illustrating the time saved in the channel switching delay due to changing the steam order in accordance with the embodiments herein.
Figure 4B:
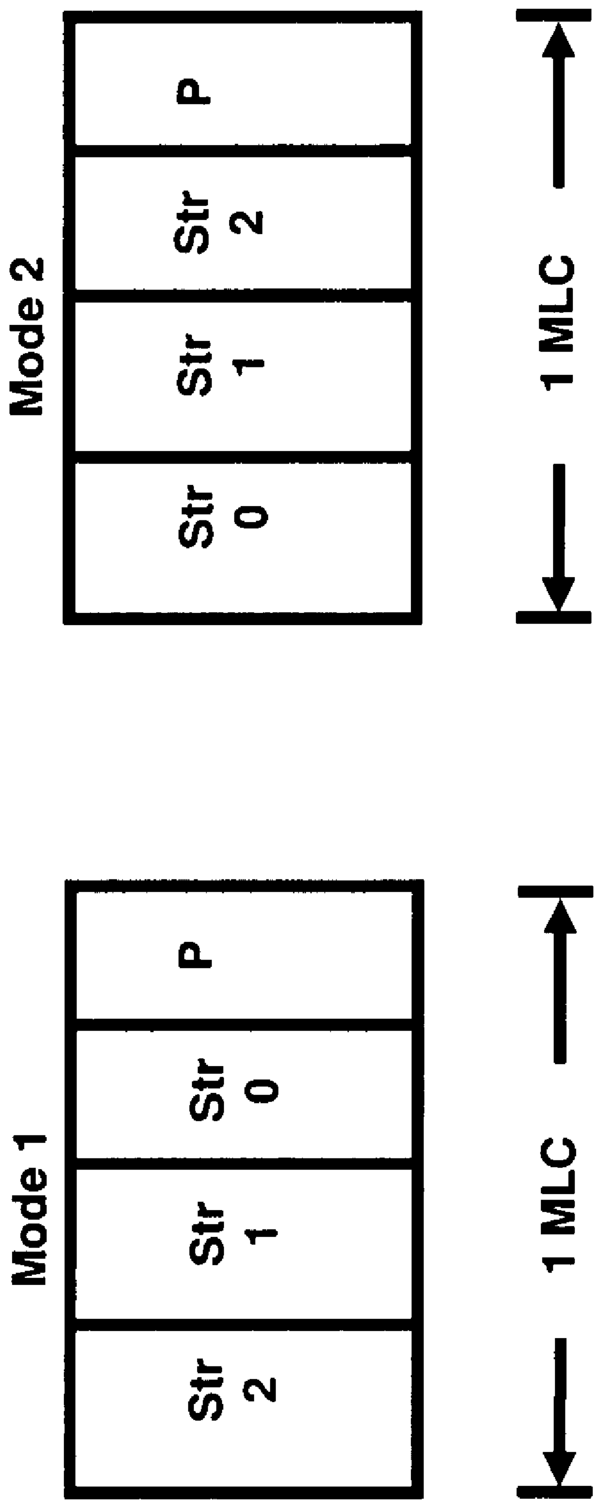
FIG. 4(B) is a schematic diagram illustrating the switching order of streams 0, 1, and 2 in the MLC in accordance with the embodiments herein.

Unlike the normal case in FIG. 3(A), the decryption begins at a position of approximately half of super-frame 3. To ensure backward compatibility with the already existing receivers, this stream order change can be an option which offers an improved service; i.e. the transmitter will have two modes as indicated in FIG. 4(B). Mode 1 represents the already existing sequence of streams and Mode 2 represents the introduced swap of streams 0 and 2. Each service provider specifies the mode of transmission available for each user. Furthermore, it may be an option for improved service per channel, wherein the user decides whether he wants it or not when buying the service.

Figure 5:
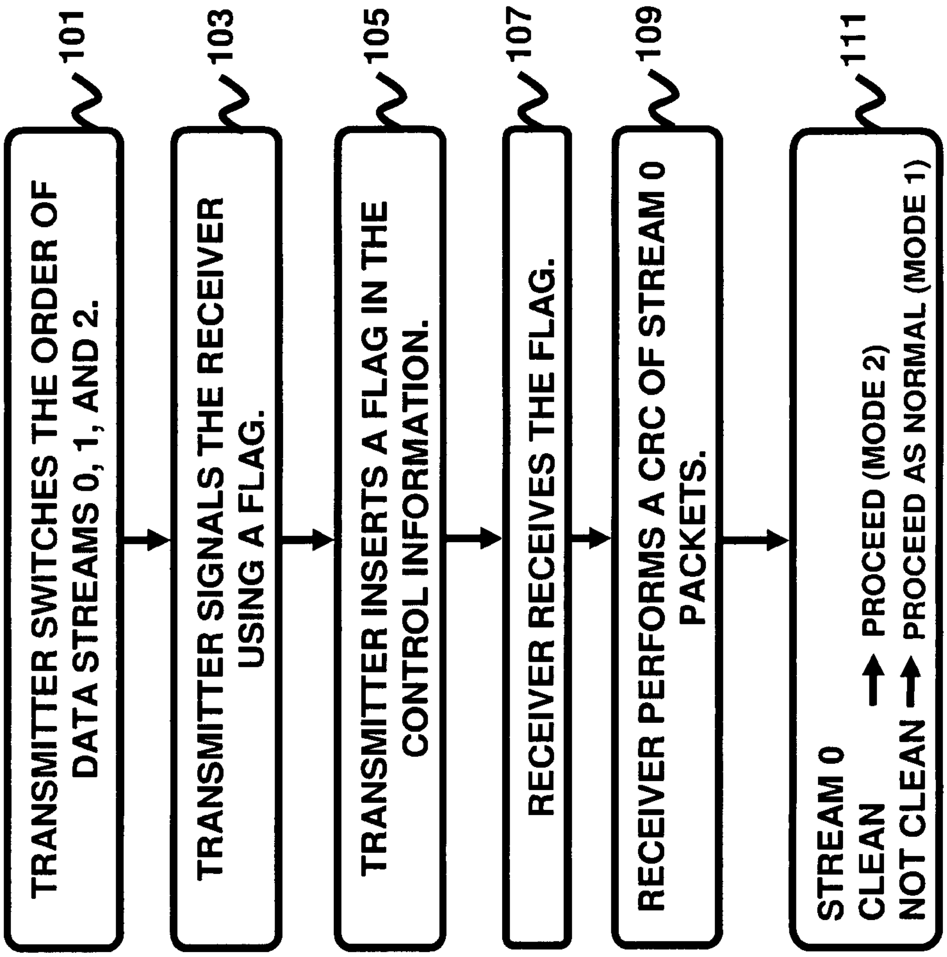
FIG. 5 is a flow diagram illustrating a preferred method in accordance with the embodiments herein.

FIG. 5 illustrates a method of enhancing the stream layer transmission for the MediaFLO™ mobile multimedia multicast system according to an embodiment herein. First, the transmitter switches (101) the order of streams 0, 1, and 2. Next, the transmitter signals (103) the receiver using a flag, which is embodied as an extra bit sent in one of the control messages to the receiver per each MLC. As the user turns to a certain channel, the transmitter signals the receiver to specify the mode of MLC transmission and this is performed per MLC. In this regard, 1 bit shows the mode. In other words, this bit will be either '1' or '0' so, '0' indicates Mode 1 and '1' indicates Mode 2. More particularly, the transmitter (105) inserts the flag in the control information. In other words, the flag is inserted within the control information that is transmitted per MLC. The control information is information transmitted by the control layer to assist the FLO device to select, receive, and decode particular services in the FLO.

Thereafter, the receiver receives (107) the flag. At the receiver, when control information is received within a super-frame (for each MLC), the flag indicates the transmission mode of a certain channel for a specific user. Finally, the receiver performs (109) a Cyclic Redundancy Check (CRC) of stream 0 packets. Each packet contains a couple of bits at its end that contains a computation result performed on the transmitted payload (i.e., the bits that represent the actual information the transmitter wants to send) and appended to it at the end of the packet. At the receiver, the same computations are performed on the received payload and the result is compared with the received one (i.e., the computation result received within the bits at the end of the received packet). If the two results are equal, then this indicates correct reception of that payload. If the two results are different, then an error is detected but not corrected. Correction is performed per super-frame. Preferably, the fourth frame in every super frame contains redundant data used to correct errors at the receiver.

If for example, the transmission is in Mode 2 and the receiver executes the steps of (1) looking for the TDM1 symbol indicating the beginning of a super-frame and looks for the OIS symbols to acquire all of the information about the specific location of the MLC in the current super-frame that belongs to the channel requested by the user, and (2) looking for stream 0 to extract several ECM and EIM messages from it as the receiver reaches the MLC in any of the four frames of the super-frame, then the receiver will proceed to step of using the ECM and EIM messages in addition to an EMM message to extract the CW for a subsequent descrambling process and either the received streams are detected as correct or they contain an error. To avoid wasted processing in CW extraction performed on errored streams 0, a CRC check is performed at the receiver on stream 0 packets. Stream 0 is the packet which contains the messages used in CW extraction; therefore it must be correct before proceeding to the subsequent transmission steps to avoid any errors in the CW. In the next step (111), if an error is detected, then the receiver switches to Mode 1 and waits until the redundant data sent at the fourth frame to correct the errored stream 0 packets arrives, and then the receiver uses the ECM and EIM messages in addition to an EMM message to extract the CW for a subsequent descrambling process. If the packets are clean (i.e., error-free), then the receiver proceeds with Mode 2 and the receiver uses the ECM and EIM messages in addition to an EMM message to extract the CW for a subsequent descrambling process.

The techniques provided by the embodiments herein may be implemented on an integrated circuit chip (not shown) and may be used in digital video broadcast systems for handheld devices, and implemented in the baseband chip sets. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein may also include both hardware and software elements and may be implemented in computer logic. Preferably, the software embodiments include, but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 6:
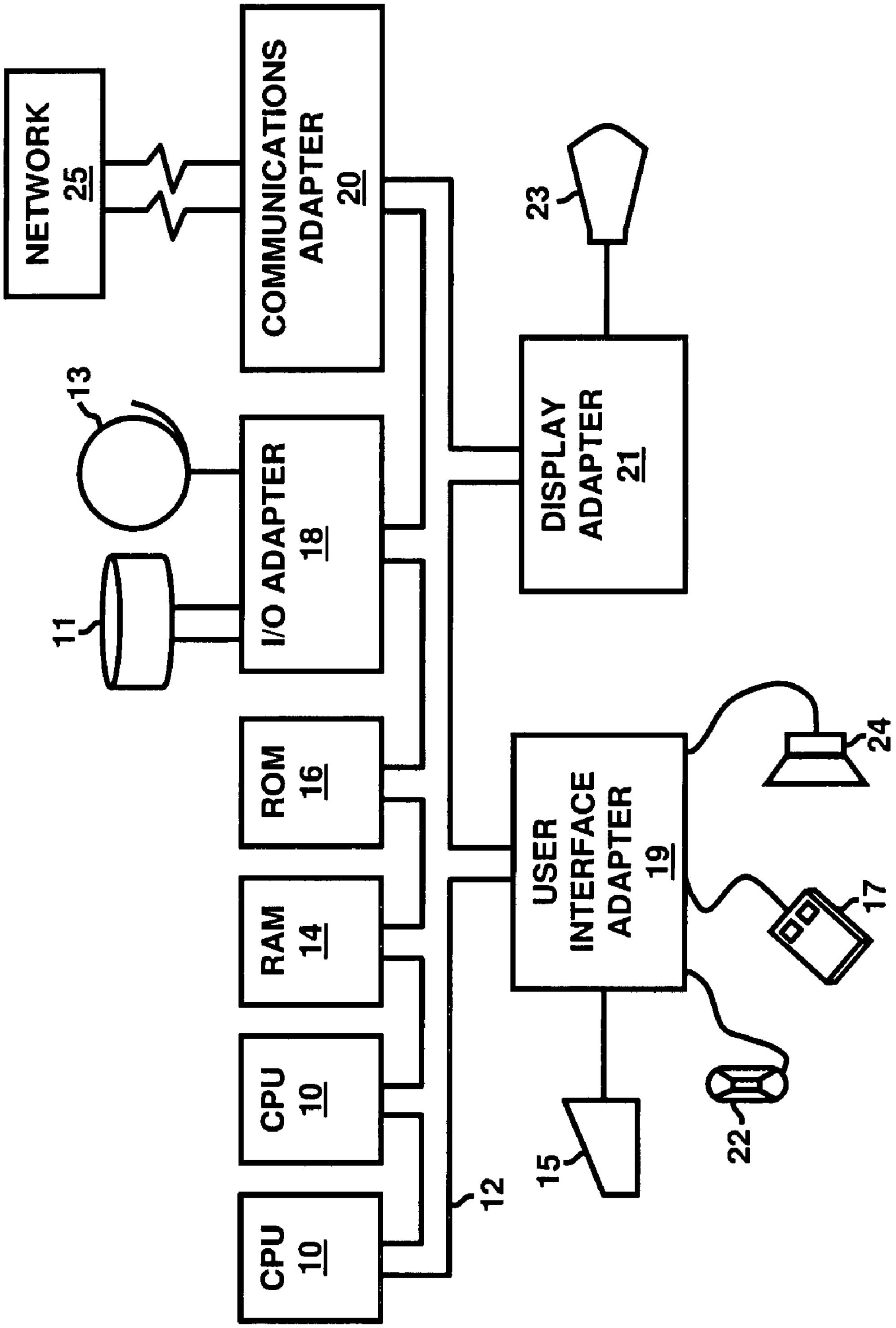
FIG. 6 is a schematic diagram illustrating a computer hardware architecture used in accordance with the embodiments herein.

A representative hardware environment for practicing the embodiments herein is depicted in FIG. 6. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

Figure 7:
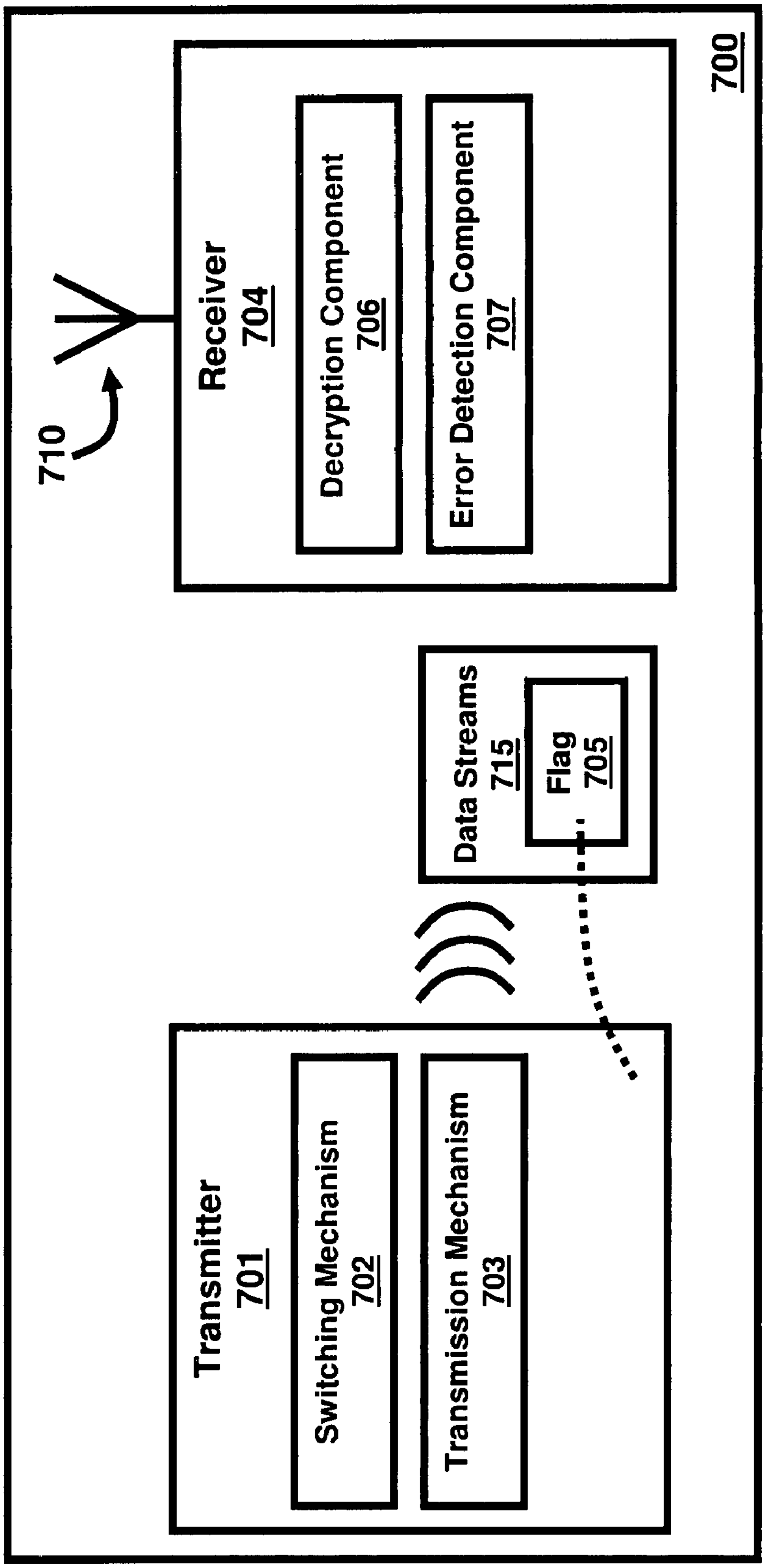
FIG. 7 is a schematic diagram illustrating a system in accordance with the embodiments herein.

FIG. 7 is a block diagram illustrating a system 700 for enhancing stream layer transmission for a MediaFLO mobile multimedia multicast environment, wherein the system 700 comprises a transmitter 701 adapted to send a plurality of MLCs forming a data frame, wherein each MLC comprises multimedia data streams 715 comprising a stream 0 data packet, a stream 1 data packet, a stream 2 data packet, and parity data bits, and wherein four data frames comprises a super-frame; a switching mechanism 702 in the transmitter 701 adapted to switch an order of the multimedia data streams of the MLC transmitted by the transmitter 701; a transmission mechanism 703 in the transmitter 701 adapted to send a signal to a receiver 704 to specify a mode of transmission of the MLC, wherein the mode of transmission comprises an order of transmitting the data packets of the MLC; a flag 705 inserted by the transmitter 701 in control information transmitted in the stream 0 data packets in the MLC, wherein the receiver 704 is adapted to receive the flag 705 (via antenna 710) to determine the mode of transmission; and CRC hardware on the receiver to perform a CRC of the stream 0 data packet.

Preferably, the switching of the order of the multimedia data streams of the MLC comprises swapping the stream 2 data packet with the stream 0 data packet, wherein the mode of transmission comprises a first mode comprising an original sequence of multimedia data streams, and a second mode comprising the swapped sequence of multimedia data streams. Preferably, the receiver 704 comprises a component 706 adapted to decrypt all of a first and second frame of the super-frame in the receiver 704 prior to receiving a third frame of the super-frame in the receiver 704. Also, the mode of transmission may be adapted to be personalized for individual receivers. Additionally, at the receiver 704, when the control information is received within a super-frame for each the MLC, the flag 705 indicates the mode of transmission of a certain channel for a specific receiver. Moreover, the system 700 may further comprise an error detection component 707 in the receiver 704 adapted to perform error detection on the multimedia data streams.

Also, the system 700 may further comprise an error corrector component 708 in the receiver 704 adapted to correct errors in the multimedia data streams using redundant data stored on a fourth frame of the super-frame. Preferably, if an order of the mode of transmission has the stream 0 data packet presented first, then the receiver 704 decodes the stream 0 data packet, and upon successful reception of the stream 0 data packet in the receiver, then the receiver 704 extracts a CW from the super-frame and performs decryption of the super-frame while receiving data frames. Alternatively, if the stream 0 data packet is incorrectly decoded based on a result of the CRC check, then the receiver 704 waits until an end of a transmission of the super-frame to perform a RS decoding process on all content of the super-frame. Still alternatively, if an order of the mode of transmission has the stream 0 data packet presented last, then the receiver 704 waits until an entire super-frame is received prior to performing decryption of the super-frame.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method of enhancing stream layer transmission for a mobile multimedia multicast system comprising a transmitter and a receiver, said method comprising:

sending a plurality of multicast logical channels (MLCs) forming a data frame from said transmitter, wherein each MLC comprises multimedia data streams comprising a stream 0 data packet, a stream 1 data packet, a stream 2 data packet, and parity data bits, and wherein four data frames comprises a super-frame;

switching, by said transmitter, an order of said multimedia data streams of said MLC transmitted by said transmitter;

sending a signal to said receiver from said transmitter to specify a mode of transmission of said MLC, wherein said mode of transmission comprises an order of transmitting the data packets of said MLC;

inserting, by said transmitter, a flag in control information transmitted in said stream 0 data packets in said MLC;

receiving, at said receiver, said flag;

decoding, by said receiver, said flag to determine said mode of transmission; and performing, by said receiver, a cyclic redundancy check (CRC) of said stream 0 data packet.

2. The method of claim 1, wherein the switching of said order of said multimedia data streams of said MLC comprises swapping said stream 2 data packet with said stream 0 data packet.

3. The method of claim 2, wherein said mode of transmission comprises a first mode comprising an original sequence of multimedia data streams, and a second mode comprising the swapped sequence of multimedia data streams.

4. The method of claim 1, further comprising decrypting all of a first and second frame of said super-frame in said receiver prior to receiving a third frame of said super-frame in said receiver.

5. The method of claim 1, further comprising personalizing said mode of transmission for individual receivers.

6. The method of claim 1, wherein at said receiver, when said control information is received within a super-frame for each said MLC, said flag indicates said mode of transmission of a certain channel for a specific receiver.

7. The method of claim 3, further comprising performing error detection on said multimedia data streams.

8. The method of claim 7, further comprising correcting errors in said multimedia data streams using redundant data stored on a fourth frame of said super-frame.

9. The method of claim 8, further comprising:

detecting an error in said multimedia data streams;

switching said mode of transmission to said first mode from said second mode; and correcting said error using said redundant data stored on said fourth frame of said super-frame.

10. The method of claim 1, wherein in the decoding process, if an order of said mode of transmission has said stream 0 data packet presented first, then said receiver decoding said stream 0 data packet, and upon successful reception of said stream 0 data packet in said receiver, then said receiver extracting a code word (CW) from said super-frame and performing decryption of said super-frame while receiving data frames.

11. The method of claim 1, wherein in the decoding process, if said stream 0 data packet is incorrectly decoded based on a result of said CRC check, then said receiver waiting until an end of a transmission of said super-frame to perform a Reed Solomon (RS) decoding process on all content of said super-frame.

12. The method of claim 1, wherein in the decoding process, if an order of said mode of transmission has said stream 0 data packet presented last, then said receiver waiting until an entire super-frame is received prior to performing decryption of said super-frame.

13. A system for enhancing stream layer transmission for a mobile multimedia multicast environment, said system comprising:

a transmitter that sends a plurality of multicast logical channels (MLCs) forming a data frame, wherein each MLC comprises multimedia data streams comprising a stream 0 data packet, a stream 1 data packet, a stream 2 data packet, and parity data bits, and wherein four data frames comprises a super-frame;

a switching mechanism in said transmitter that switches an order of said multimedia data streams of said MLC transmitted by said transmitter;

a transmission mechanism in said transmitter that sends a signal to a receiver to specify a mode of transmission of said MLC, wherein said mode of transmission comprises an order of transmitting the data packets of said MLC;

a flag inserted by said transmitter in control information transmitted in said stream 0 data packets in said MLC, wherein said receiver receives said flag to determine said mode of transmission; and cyclic redundancy check (CRC) hardware on said receiver to perform a CRC of said stream 0 data packet.

14. The system of claim 13, wherein the switching of said order of said multimedia data streams of said MLC comprises swapping said stream 2 data packet with said stream 0 data packet.

15. The system of claim 14, wherein said mode of transmission comprises a first mode comprising an original sequence of multimedia data streams, and a second mode comprising the swapped sequence of multimedia data streams.

16. The system of claim 13, wherein said receiver comprises a component that decrypts all of a first and second frame of said super-frame in said receiver prior to receiving a third frame of said super-frame in said receiver.

17. The system of claim 13, wherein said mode of transmission is personalized for individual receivers.

18. The system of claim 13, wherein at said receiver, when said control information is received within a super-frame for each said MLC, said flag indicates said mode of transmission of a certain channel for a specific receiver.

19. The system of claim 15, further comprising an error detection component in said receiver that performs error detection on said multimedia data streams.

20. The system of claim 19, further comprising an error corrector component in said receiver that corrects errors in said multimedia data streams using redundant data stored on a fourth frame of said super-frame.

21. The system of claim 13, wherein if an order of said mode of transmission has said stream 0 data packet presented first, then said receiver decodes said stream 0 data packet, and upon successful reception of said stream 0 data packet in said receiver, then said receiver extracts a code word (CW) from said super-frame and performing decryption of said super-frame while receiving data frames.

22. The system of claim 13, wherein if said stream 0 data packet is incorrectly decoded based on a result of said CRC check, then said receiver waits until an end of a transmission of said super-frame to perform a Reed Solomon (RS) decoding process on all content of said super-frame.

23. The system of claim 13, wherein if an order of said mode of transmission has said stream 0 data packet presented last, then said receiver waits until an entire super-frame is received prior to performing decryption of said super-frame.

* * * * *